United States Patent [19]
Prakash et al.

[11] Patent Number: 5,380,999
[45] Date of Patent: Jan. 10, 1995

[54] LINEAR SCANNING USING A SINGLE ILLUMINATION AND IMAGING OPTIC STATIONS WITH A FIRST PAIR OF PARALLEL MIRRORS AND A SECOND PAIR OF MIRRORS EXTENDING INTO PATHS OF LIGHT BEAMS

[75] Inventors: Ravinder Prakash; Gene D. Rohrer, both of Concord, N.C.

[73] Assignee: International Business Machines, Corp., Armonk, N.Y.

[21] Appl. No.: 174,744

[22] Filed: Dec. 29, 1993

[51] Int. Cl.⁶ .............................................. H01J 3/14
[52] U.S. Cl. ..................................... 250/216; 385/133
[58] Field of Search ............... 250/216, 208.1, 227.11; 358/496; 385/133; 346/157, 160

[56] References Cited

U.S. PATENT DOCUMENTS

| | | | |
|---|---|---|---|
| 4,272,684 | 6/1981 | Seachman | 250/216 |
| 4,367,009 | 1/1983 | Suzki . | |
| 4,744,615 | 5/1988 | Fan et al. | 385/133 |
| 4,811,328 | 3/1989 | Ito et al. | 369/112 |
| 4,816,922 | 3/1989 | Futaki | 358/285 |
| 5,000,570 | 3/1991 | Neilson et al. | 356/308 |
| 5,040,872 | 8/1991 | Steinle | 359/638 |

*Primary Examiner*—David C. Nelms
*Assistant Examiner*—Que T. Le
*Attorney, Agent, or Firm*—Laurence R. Letson

[57] ABSTRACT

An optical scanning station is disclosed which utilizes light bending apparatus such as mirrors or optical wedges to gather and redirect some of the illumination radiating from the object. The gathering of the light occurs off-axis from the lens and the redirection of the light to the lens causes an off-axis angle between the light beam and the lens axis, thereby resulting in multiple images which are spaced apart from each other when focused on an image plane. The multiple images may be split apart and directed to separate image planes by use of front surface mirrors making the images then available for individual capture by charge couple devices or other similar image capture apparatus. Alternatively, the outboard images may be redirected, again by mirrors, to be focused coincident to the on-axis image, thereby increasing the illumination level at the image plane well in excess of that obtainable with only a single image of the object being focused at the image plane. The primary advantage of these devices is either to permit separate images to be presented on separate image planes without the subtractive losses occasioned by use of subtractive beam splitters or to combine the multiple images to raise the illumination level of a single image at the image plane, thereby permitting the use of slower lenses or reduced illumination level at the object.

11 Claims, 5 Drawing Sheets

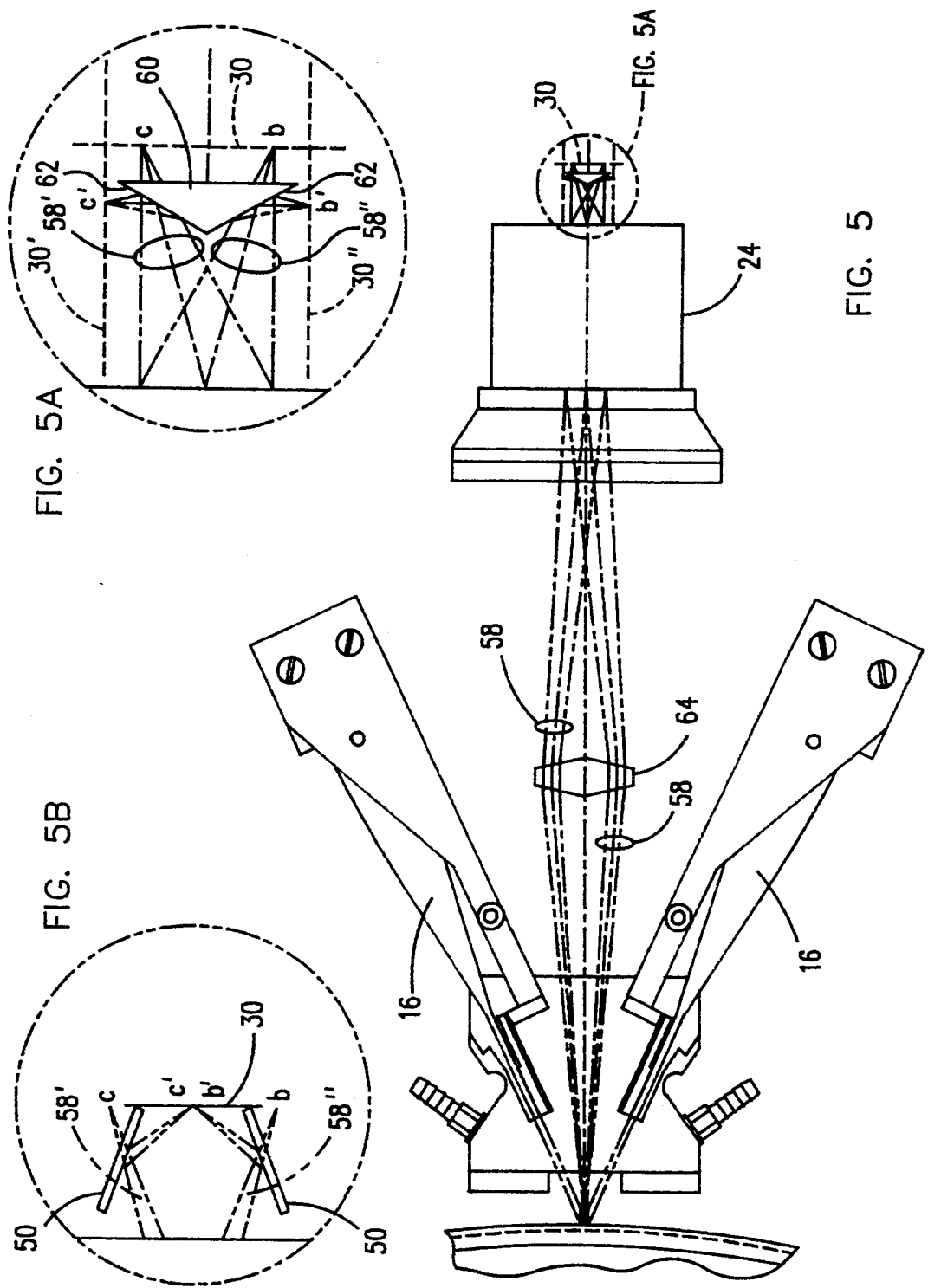

LINEAR SCANNING USING A SINGLE ILLUMINATION AND IMAGING OPTIC STATIONS WITH A FIRST PAIR OF PARALLEL MIRRORS AND A SECOND PAIR OF MIRRORS EXTENDING INTO PATHS OF LIGHT BEAMS

FIELD OF THE INVENTION

This invention relates to a scanning and illumination station of a scanner and more specifically to scanner stations constructed to focus light images of a single object onto a single point effectively increasing the f-stop of the optics or, alternatively, to separate the light images and direct them to separate image planes without reducing the light density of the individual image beam.

BACKGROUND OF THE INVENTION

Scanning of images for fraud detection, forms drop out, or color recombination to yield a color image requires the production of multiple images for electronic capture. This multiple imaging scanning requires that the lens be capable of passing sufficient light so that the light beam may be attenuated by the beam splitting function and still deliver images of adequate light intensity, or to utilize reduced light intensity beams to yield a single image of a relatively higher light intensity.

Wherever multiple images are required from the scanning station, both high levels of illumination are required at the object as well as very fast lenses which are essential in the scanning system in order to deliver sufficient light density at the image plane of the lens so that the capture device can capture the image for subsequent electronic processing. To maintain the illumination density on the object at a low enough level to prevent burning or scorching while at the same time to use lenses with reasonably attainable numerical creates a tradeoff which must be considered in the design and implementation of the systems. There is constantly a need for a larger effective f-stop for the lens of such a system. The typical approach to this problem has been to increase the illumination level on the object or to increase the numerical aperture of the lens whenever image illumination levels cannot be increased.

Conventional beam splitting techniques use a partially reflective surface in a prism to reflect an image onto a separate image plane while passing the balance of the light either to a second image plane or to an additional beam splitting surface. This conventional beam splitting requires enough light energy to ensure that the image focused on each of several image planes has sufficient light intensity or light density to be captured by a charge coupled device (CCD) positioned at each image plane. Since beam splitting is a subtractive process that requires the light level of the beam entering the beam splitter to be adequate to produce the plural images and to compensate for the light losses of transmission in the beam splitter, the only effective solution is to provide in the incoming beam a high enough light density to accommodate all the subtractive factors and transmission losses. The images produced may be variously filtered for forms dropout, fraud detection, or used for optical character recognition (OCR).

For forms dropout, at least two images of the same object must be simultaneously captured using different filtration as is conventional. These requirements dictate extremely high and correspondingly hot illumination density levels on the documents and/or extremely fast (small f-stop) lenses.

Due to the small numerical aperture of the imaging optics existent within the conventional scanning station, a very substantial amount of radiated illumination and image information escapes the lens, accordingly are unused, and serve only to consume power for illumination without providing any corresponding benefit.

SUMMARY OF THE INVENTION

It is an object of the invention to reduce the need for a very fast lens in scanning stations.

It is another object of this invention to reduce the requirement for extremely high illumination levels in scanning stations.

It is a further object of the invention to divide a plurality of images and direct the individual images to individual image planes, by using a non-subtractive process, to provide up to three identical images on three separate image planes for capture by charge couple devices and make the images available for spectral alteration by optical filtering.

It is still another object of the invention to provide plural separate images of a single object at the image plane of a lens with each of the images having substantially the same light density.

It is a further object of this invention to effectively increase the f-stop of a lens in a linear scanner design.

It is still a further object of this invention to capture some of the otherwise unusable radiated light from the object and to utilize that radiated light in order to increase the efficiency of the lens system.

A conventional scanning station for a high-speed document or check scanner has a narrow zone of illumination and a narrow field of view. The illumination from the object is widely radiated and, therefore, the usable light is only a fraction of all of the rays radiating from the object.

Any radiated rays which are too widely divergent from the lens axis to be captured and focused by the lens will escape and serve no useful function although these rays carry image information. With the placement of one or two mirrors parallel with the axis of the lens and disposed between the object and the object surface of the lens, the rays from the object scan point which would otherwise be unused can be redirected to the lens. The redirected rays, making up the beam, will be significantly off-axis or outboard in comparison to the on-axis illumination of the rays from the object and as such will result in a separate image on the image plane displaced from the on-axis image.

The redirected beam for each image diverges from the lens axis after exiting the lens and may be manipulated to accomplish one of several results, dependent upon the needs of the system.

A first embodiment of this invention intercepts the outboard image beams (the rays that form the image which are diverging from the lens axis after exiting from the lens) and bends these image beams back to the same point on the image plane as the on-axis image. This permits the additive combination of the separate images, the on-axis image, and the off-axis images. Thus, the total illumination at the image plane and at the point where the on-axis image is focused is two or three times the illumination level that would be present at that point without the mirrors collecting the diverging images then reflecting and repositioning those images to the same point as the on-axis image. The two or three times illumination variance depends upon whether the system is implemented by means of a single mirror or a pair of mirrors positioned intermediate the lens and the object.

The primary advantage to this embodiment is to reduce the aperture requirement for the lens or system or alternatively to increase the effective f-stop of the existing lens system. Either a slower lens (smaller numerical aperture, N.A.) or a reduced level of object illumination may be utilized or required.

A second embodiment of the invention may be fabricated if the need in the system is for a plurality of simultaneous images of the object for use in color imaging useful in optical character recognition, forms dropout, or fraud detection. For example, in implementations where forms dropout is used, three simultaneous images are presented and selectively optically filtered. After filtering, each image must have sufficient light intensity to be captured by a capture device such as a charge coupled device.

When beam splitters are used, as in the prior art, the light intensity of the single on-axis light beam is progressively reduced with each image split off. Accordingly, the light intensity of the combined beam must be greater than or equal to the image intensity of individual images combined plus any transmission losses through the beam splitter.

By using the ray-bending parallel mirrors disposed between the lens assembly and the object, it is possible to create one or two additional images from light which otherwise would be lost or not utilized. The length as well as the width of the mirrors necessary may be determined by ray tracing so that the length and width of the mirrors is slightly longer and wider than that needed to reflect and redirect the outer rays of an light beam which may be directed onto the object surface of the lens assembly. With the length and the width of the mirror selected to gather and redirect a ray bundle or beam of about the same spot size as the on-axis ray bundle or beam which radiates directly from the object to the object surface of the lens assembly, the image formed by each mirror will possess approximately the same light intensity as the on-axis image.

As the rays forming the images emerge from the lens, the outboard or off-axis images may be manipulated as desired. The manipulation of this second embodiment may be by a pair of knife-edged mirrors, preferably front or first surface mirrors, to reflect the outboard images onto separate image planes. The scanning station may have at those separate image planes, optical filters to alter the spectral characteristics of the image and CCD capture devices to receive the images and convert them to electronic form for further computer utilization. The separate images may be filtered as necessary using broad spectrum filters for forms dropout, or notch filters for other manipulation or use of the images as required by the particular system.

A better understanding of the structure, function and result of the instant invention may be had by referring to the attached drawings and from the detailed description of the invention to follow.

DRAWINGS

FIG. 3A is an enlargement of a portion of FIG. 3, illustrating the treatment of the images emerging from the lens to cause separation and focusing of the images onto three separate and distinct image planes.

FIG. 5 is an illustration of an alternative embodiment where an optical wedge is utilized to separate the light beam radiating from a scan point such that two images are formed at the image plane.

FIG. 5A is an enlargement of the corresponding portion of FIG. 5, illustrating the image deflection arrangement of FIG. 5. FIG. 5B is an illustration of a mirror arrangement that may be used with the optical wedge arrangement of FIG. 5 to combine the separate images.

DETAILED DESCRIPTION OF THE PREFERRED EMBODIMENTS OF THE BEST MODE CONTEMPLATED BY THE INVENTORS FOR CARRYING OUT THE INVENTION

Figure 1:
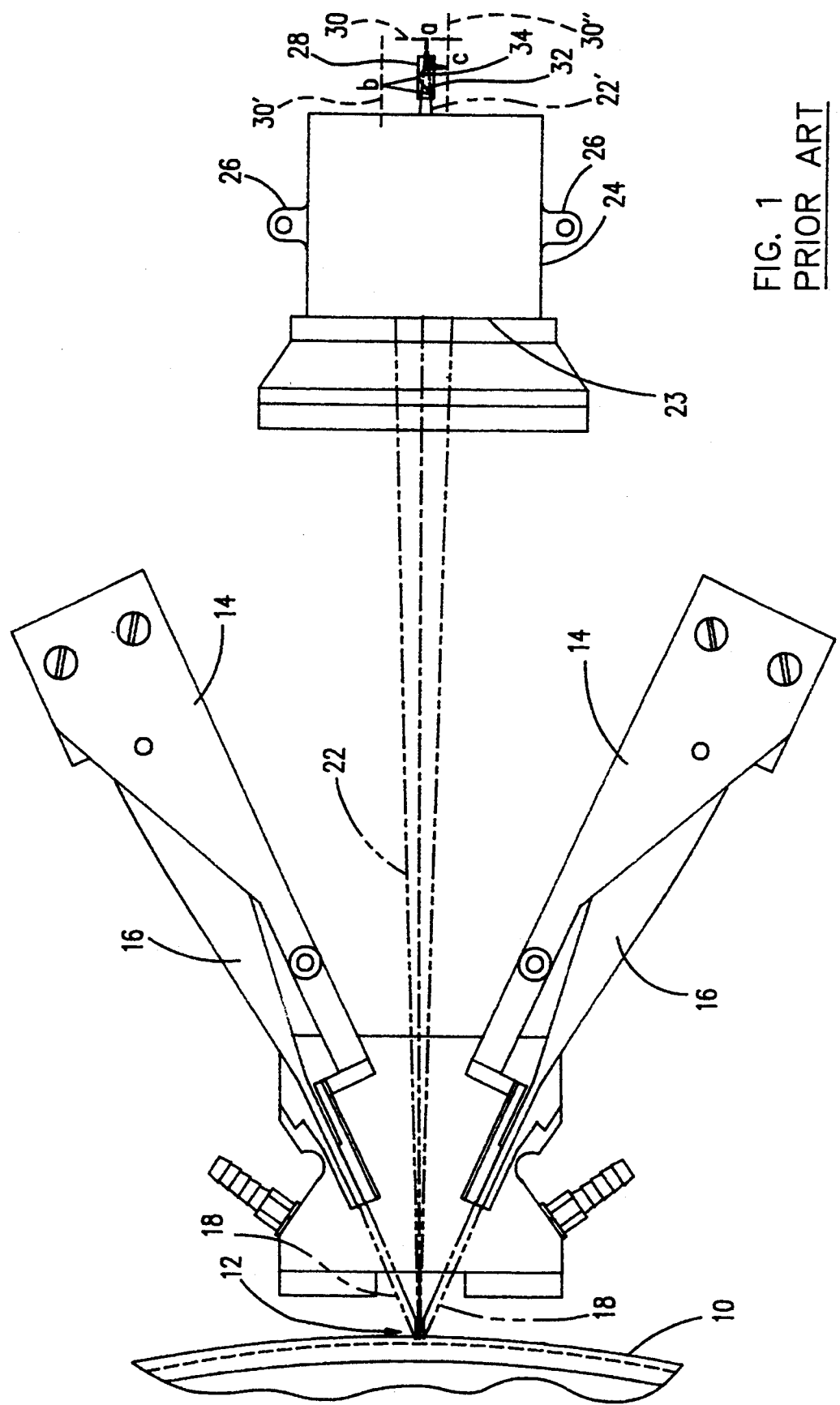
FIG. 1 illustrates a conventional scanning and imaging station such as utilized in check scanning stations.

Referring now to FIG. 1, the conventional scanning station of at least one prior art device is illustrated. A brief description of this scanning station will be beneficial since the embodiments of this invention are embodied into the scanning station.

A drum document transport system 10 carries documents such as checks (not shown) to be scanned past the scanning point 12. In order to provide sufficient illumination necessary to scan, a pair of illumination stations 14 are provided. Illumination stations 14 typically include an illumination source such as a light bulb (not shown) and an illumination collector (not shown). The illumination collector has the ability to concentrate the light from the light bulb (not shown) into a fiber optic bundle 16. Fiber optic bundle 16 is arranged to provide a narrow output or projected beam of light 18, where the beam 18 has a depth at least as wide as the document being scanned and impinges onto the document transport system 10 or the document itself whenever the document is resident at the scanning point 12. The light beams 18 are highly concentrated illumination and brightly illuminate scan point 12.

As the light illuminates scan point 12, rays from object scan point 12 will be radiated. The rays radiating from the object surface A are portrayed as a beam 22 which radiates from the object to the object surface 23 of lens assembly 24. Lens assembly 24 is mounted on a bracket 26 which spatially affixes the lens 24 relative to the other elements of the system. The rays forming a single image emanating from the lens 24 then are transmitted through a beam splitter 28 to provide three identical images a, b and c on three separate image planes 30, 30' and 30".

Beam splitter 28 is a conventional optical element which has, in this application, two partially reflective surfaces 32 and 34 which partially reflect light from the beam 22' emanating from lens 24 to provide the images on each of the three image planes, 30, 30', 30". As one will appreciate, with each image being split from the light beam 22' coming from lens 24, the light intensity of the beam 22' is reduced at each beam splitting surface 32, 34 by the amount of light energy reflected by partially reflective surface 32 or 34. Thus, the image passing completely through the beam splitter 28 to focus on image plane 30 is a relatively minor fraction of the overall light energy of the beam 22'. The optical result of this beam splitter 28 is three identical images available at their respective image planes 30, 30', 30" for capture by a conventional image capture device such as a bank of CCDs (not shown). The minimum acceptable light intensity of the CCDs determines the minimum light intensity of each of the images falling onto a CCD; and, accordingly, the summation of that light energy plus any transmission losses through the beam splitter 28 and the lens 24 determine the light intensity necessary to be present in beam 22.

Figure 2:
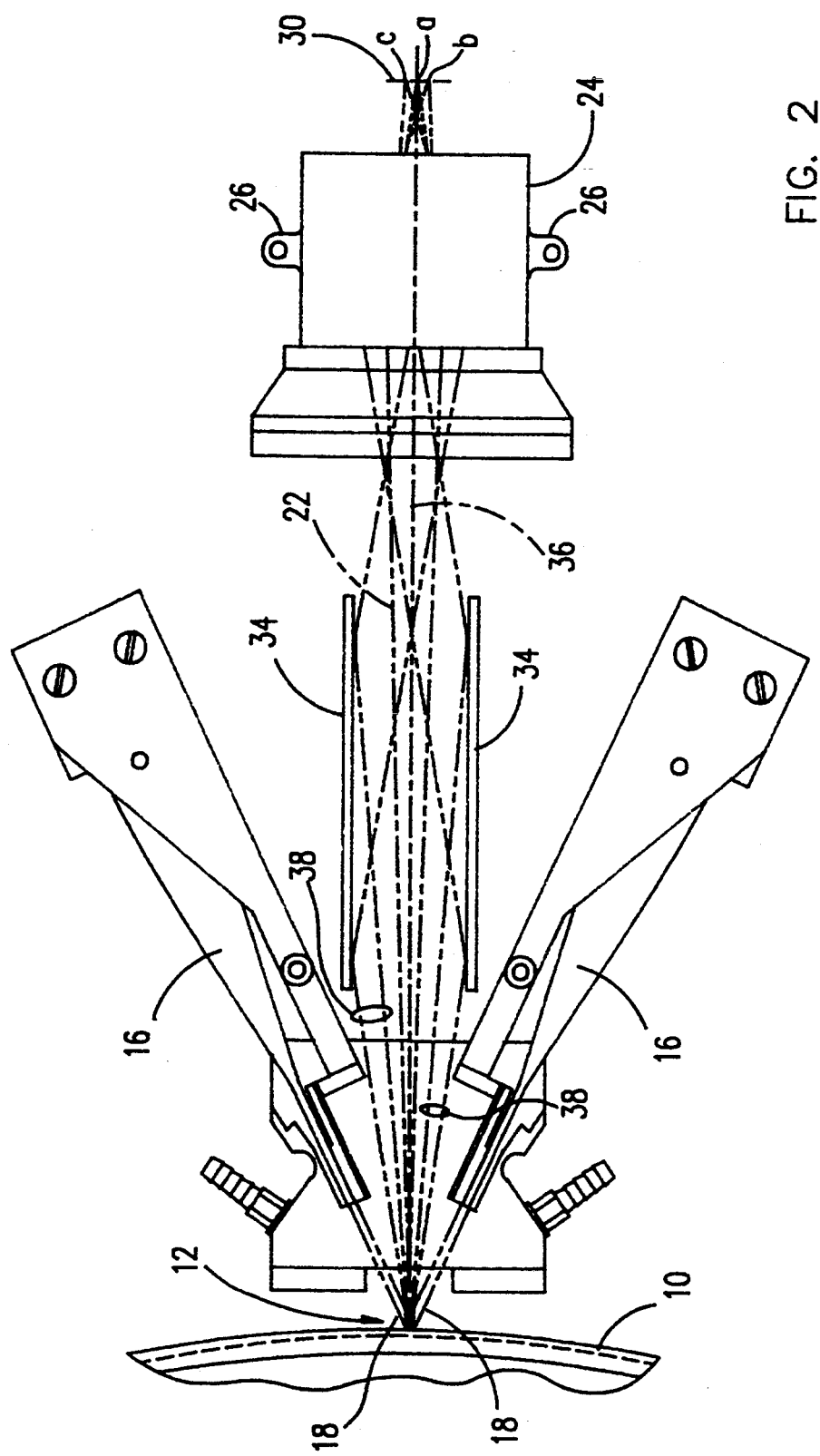
FIG. 2 illustrates the addition of the folding mirrors parallel to and along either side of the lens axis extended in the object direction, along with the diverging light beams which emanate from the image surface of the lens assembly.

Referring now to FIG. 2, it will be appreciated that as the illumination beams 18 emanating from the fiber optic bundles 16 illuminate the scan point 12, all the rays of light radiating from scan point 12 will not conform to the region 26 between the outer ray traces of beam 22. Accordingly, much of the light energy directed upon scan point 12 by the fiber optic bundle 16 will be radiated into regions where the light energy is unusable and accordingly wasted.

Mirrors 34 are positioned parallel to the axis 36 of lens 24. The mirrors 34 are positioned to redirect the bundles of light or beams 38 from a region of non-utility to the object surface 23 of lens 24. Redirecting light beams 38, which contain and carry all of the optical information of the object from scan point 12 onto the object surface 23 of lens 24, produces second image b and third image c which result from the off-axis light beams 38. Since the light beams 38 are off-axis, they will result in images b and c on image plane 30 that are displaced along image plane 30 from image a, which is the on-axis image formed from light beam 22. From the foregoing, it is apparent that the addition of mirrors 34 will result in one additional image for each added mirror at the image plane 30.

With the availability of three identical and substantially equal illumination density images a, b, c at the image plane 30, the three images may be used in differing ways.

Figure 3:
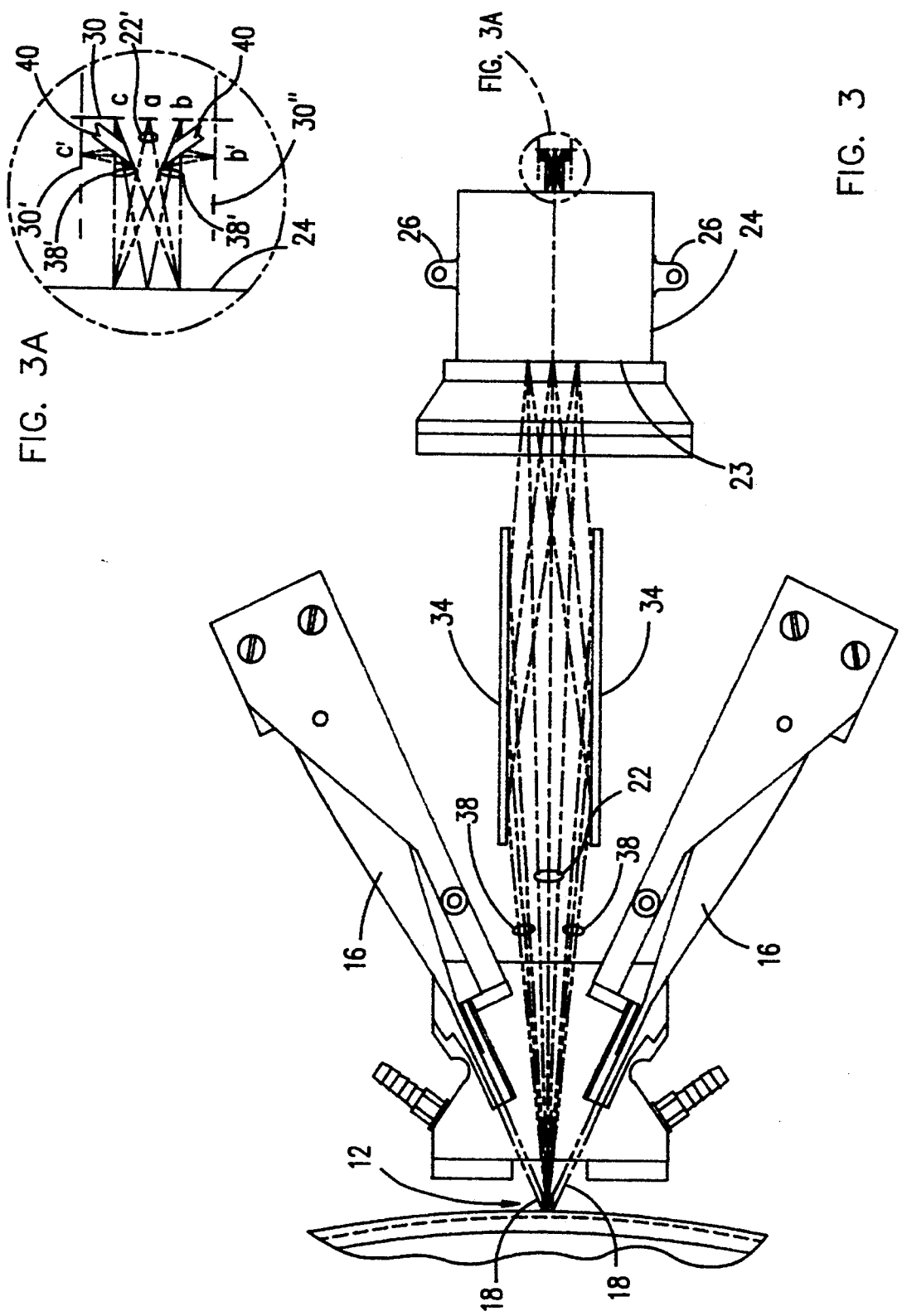
FIG. 3 illustrates an embodiment of the invention wherein a pair of knife-edged mirrors separate the outboard images and direct them to the separate and individual image planes without affecting the illumination intensity of the on-axis image or the respective outboard images.

One embodiment of the invention which manipulates the separate images is illustrated in FIG. 3 and all elements previously described with respect to FIGS. 1 and 2 remain the same with the exception of the manner in which the images a, b and c are manipulated and utilized. Referring to FIG. 3, the light beams 38' forming the images exit lens 24 and are illustrated in FIG. 3A.

As the beam 38', 22' images exit lens 24, they all diverge from each other. If left unmanipulated, they will impinge and focus on image plane 30 as illustrated by the solid lines in FIG. 3A.

Disposed within the optical path of the beams 38' forming image c and image b, prior to the focusing of images c and b onto image plane 30, are mirrors 40. Mirrors 40, preferably front surface mirrors, are fabricated to be what may be referred to as knife-edged mirrors where the backing support material supporting the reflective plane is relieved away from the edge to prevent interference with the rays of closely spaced apart image a. The knife edged mirrors 40 are disposed and positioned in the path of the rays forming images c and b, effectively reflecting or bending those light beams 38' to cause them to impinge and focus on image planes 30' and 30" respectively. This arrangement provides three distinct but identical images a, c' and b' which may be then used in processes such as forms dropout. Filters (not shown) may be inserted into the path of images a, b' and c' should filtration of the light beams 38' be desired for the particular utilization of those images a, b' and c'.

Figure 4:
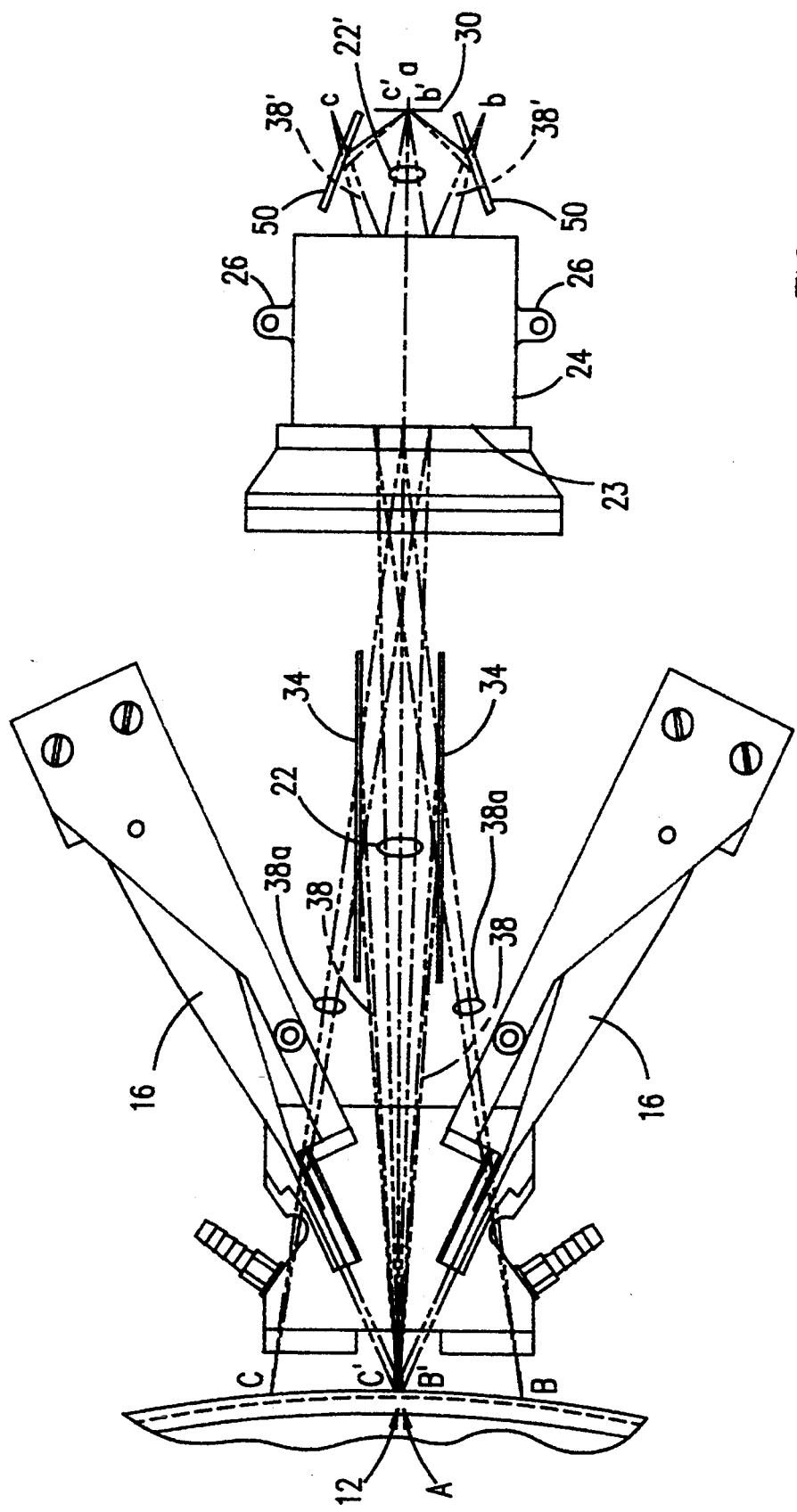
FIG. 4 illustrates the system of FIG. 2 with the addition of ray folding mirrors disposed to reposition the off-axis images onto the on-axis image on the image plane.

With respect to FIG. 4, the beams 22 and 38 are all directed, either naturally or by means of mirrors 34, onto the object surface 23 of the lens 24. Light beams 38a represent the apparent objects B and C which correlate to images b and c at image plane 30. The actual objects radiating light beams 38, which are bent by mirrors 34, are objects B' and C'. Object A radiates light beam 22 which forms image a at image plane 30.

Light beams 38' emanating from lens 24, enroute to forming images b and c, are folded to form images b' and c'. Mirrors 50 are disposed in the paths of the beams 38' as beams 38' emerge from lens 24 to reflect or fold the beams 38' so that the beams 38' are focused at the same point on image plane 30 as image a is focused.

The effect of this redirection of beams 38' is to superimpose the images b' and c' onto image a. Assuming that each of the three images a, b', c' contain substantially the same light energy, the three coincident images a, b', c' will add to each other and the effective illumination will be three times that of the illumination provided only by image a.

Whenever the scanning system only requires a single image, the combination of the three images a, b', c' provides a higher illumination level at the image plane 30 where image a is focused and, therefore, allows either a commensurate reduction of the illumination provided by the optical fiber bundles 16 at object scan point 12 or permits the use of a slower (larger f-stop number) lens 24.

The mirrors 34, 40 and 50 are preferably all front surface mirrors. Second surface mirrors may be used if precautions such as anti-reflective coatings are used to suppress ghost imaging. Further refraction of the mirror glass must be compensated for in the positioning of the mirrors 34, 40, 50.

The image deflection apparatus in FIGS. 5 and 5a is a triangular cross-sectioned member 60 with front surface reflectors, in effect, a mirror with two precisely controlled reflective surfaces 62 to deflect or bend the beams 58', 58" emanating from the lens 24 to position the images b' and c' onto image planes 30" and 30' respectively.

Referring to FIG. 5B, the mirror arrangement of FIG. 4 may be used to redirect the beams 58', 58" to a common focus image point combining images b' and c', effectively doubling the illumination level at the image plane 30.

Since the function of the mirrors 34 in FIGS. 2, 3 and 4 is purely to bend the light beams 38 in a controlled fashion and thereby precisely to position the light beams 38 on the object surface 23 of the lens assembly 24, the optical wedge 64 in FIG. 5 performs precisely the same function, only it uses a different structure to bend the light beams 58.

It should be understood that utilizing an optical wedge wherein a center portion of the wedge would have parallel surfaces and outlying portions of the wedge would have converging front and rear surfaces will provide a set of three identical images, should such an arrangement be desired.

While there have been illustrated and described herein several embodiments of the illumination and scanning station together with the optics required to manipulate the images as desired, it should be understood that various combinations of optical elements can be substituted for other optical elements and thereby create different combinations of devices which in turn will produce substantially the same results. Such substitution, modification or other minor changes as may be envisioned by one of skill in the art should not remove the modified apparatus from the scope of protection provided by the attached claims.

We claim:

1. An optical imaging station of an optical scanner for providing multiple images of a single object, comprising:
    a document transport for transporting documents to be scanned past a scanning point;
    an illumination source;
    an illumination concentrating system intermediate said illumination source and said scanning point;
    a first pair of parallel mirrors;
    a lens assembly having an axis;
    said scanning point, said first pair of mirrors and said lens assembly all aligned along said lens assembly axis;
    and a second pair of mirrors arranged on the image side of said lens, intermediate said lens assembly and an image plane of said lens assembly, each of said second pair of mirrors extending into paths of light beams passing from said lens assembly to said image plane, whereby multiple images of an object at said scanning point are deflected from their normal path.

2. The optical imaging station of claim 1 wherein said second pair of mirrors are disposed to deflect said light beams away from said lens axis, whereby multiple images of said object at said scanning point are separated into a plurality of discrete images available for capture by a plurality of image capture devices.

3. The optical imaging station of claim 2 wherein said second pair of mirrors are disposed to deflect said light beams to a position where a focal point of said light rays is substantially coincident with a focal point of light rays which are not deflected by said second pair of mirrors and illumination from such images are additive at said image plane of said lens.

4. The optical imaging station of claim 2 wherein said first pair of mirrors are front surface mirrors and are disposed one on each side of and parallel to said lens axis.

5. The optical imaging station of claim 4 wherein said second pair of mirrors are front surface mirrors having a support member and each have at least one edge of said support member relieved to permit division of images by said edge and said second set of mirrors are disposed at an angle to said lens axis, thereby deflecting beams of said image to a separate image plane for each mirror.

6. The optical imaging station of claim 2 wherein said second pair of mirrors extend into said path of light beams to said axis whereby said second pair of mirrors divide said light rays into two portions of said light beam, each said portion defining an image of said object.

7. The station of claim 3 wherein said first pair of mirrors are front surface mirrors and are disposed one on each side of and parallel to said lens axis.

8. The optical imaging station of claim 7 wherein said second pair of mirrors are front surface mirrors having a support member and each have at least one edge of said support member relieved to permit division of images by said edge and said second set of mirrors are disposed at an angle to said lens axis, thereby deflecting beams of said image to a separate image plane for each mirror.

9. An optical imaging station of an optical scanner to provide multiple images of a single object comprising:
    a document transport for transporting documents to be scanned past a scanning point;
    an illumination source;
    an illumination focusing system intermediate said illumination source and said scanning point;
    a light ray bending element for bending a first plurality of light rays and for bending a second plurality of light rays each plurality of light rays being bent toward the other of said plurality of light rays;
    a lens assembly having an axis;
    said scanning point, said light ray bending element, said lens assembly all aligned along said lens assembly axis;
    and a pair of mirrors arranged on the image side of said lens, intermediate said lens assembly and an image plane of said lens assembly, each of said pair of mirrors extending into paths of light beams passing from said lens assembly to said image plane, whereby multiple images of an object at said scanning point are deflected from their normal path.

10. The optical imaging station of claim 9 wherein said pair of mirrors are disposed to deflect said light rays away from said lens axis, whereby said images of said object at said scanning point are separated into a pair of discreet images available for capture by a plurality of image capture devices.

11. The optical imaging station of claim 9 wherein said pair of mirrors are disposed to deflect said light rays to a position where focal points of said first and second plurality of light rays are substantially coincident and illumination from such images are additive at said image plane of said lens.

* * * * *